United States Patent
Stump

[19]

[11] Patent Number: 6,014,906
[45] Date of Patent: Jan. 18, 2000

[54] BALL SCREW AND NUT ASSEMBLY INCORPORATING A PARTIBLE MULTIPLE JAW SUPPORT SYSTEM FOR SUPPORTING AN AXIALLY ROTATABLE BALL SCREW

[75] Inventor: Edward L. Stump, Frankenmuth, Mich.

[73] Assignee: Thomson Saginaw Ball Screw Company, LLC, Saginaw, Mich.

[21] Appl. No.: 09/134,292

[22] Filed: Aug. 13, 1998

Related U.S. Application Data

[60] Provisional application No. 60/080,097, Mar. 31, 1998.

[51] Int. Cl.⁷ .............................. F16H 27/02; B23P 11/00
[52] U.S. Cl. .................................... 74/89.15; 74/424.8 R; 29/434; 29/898.062
[58] Field of Search ............................ 74/89.15, 424.8 R, 74/459; 29/898.06, 898.062, 434

[56] References Cited

U.S. PATENT DOCUMENTS

| | | |
|---|---|---|
| Re. 14,299 | 5/1917 | Peterson . |
| 3,606,807 | 9/1971 | Rast . |
| 4,565,104 | 1/1986 | Akin ........................................ 74/89.15 |
| 4,572,014 | 2/1986 | Kluczynski . |
| 4,848,174 | 7/1989 | Brown et al. ........................... 74/89.15 |
| 5,425,607 | 6/1995 | Hardesty . |
| 5,482,416 | 1/1996 | Reko . |
| 5,637,940 | 6/1997 | Nagai et al. ......................... 74/89.15 X |
| 5,852,949 | 12/1998 | Cartensen ........................... 74/89.15 X |

*Primary Examiner*—Thomas R. Hannon
*Assistant Examiner*—Brandon Stallman
*Attorney, Agent, or Firm*—Reising, Ethington, Barnes, Kisselle, Learman & McCulloch, P.C.

[57] ABSTRACT

A ball screw and nut actuator assembly comprising an elongate ball screw supported for rotation while restrained from moving axially; a ball nut formed to provide a ball raceway with said screw incorporating load bearing balls therein; partible, normally closed jaw members with opposed curvilinear surfaces for virtually encircling and supporting the screw land interjacent the ends of the ball screw, the jaw members having projecting support legs; a mount system swingably mounting said legs for movement in opposed directions from a first position in which the curvilinear surfaces embrace the land to a removed second spread apart position; and spreaders on each end of the ball nut in position to interact with and spread the jaw members upon axial engagement therewith to permit axial passage of the nut past the jaw members. The methods of constructing and operating the assembly are also disclosed and claimed.

16 Claims, 2 Drawing Sheets

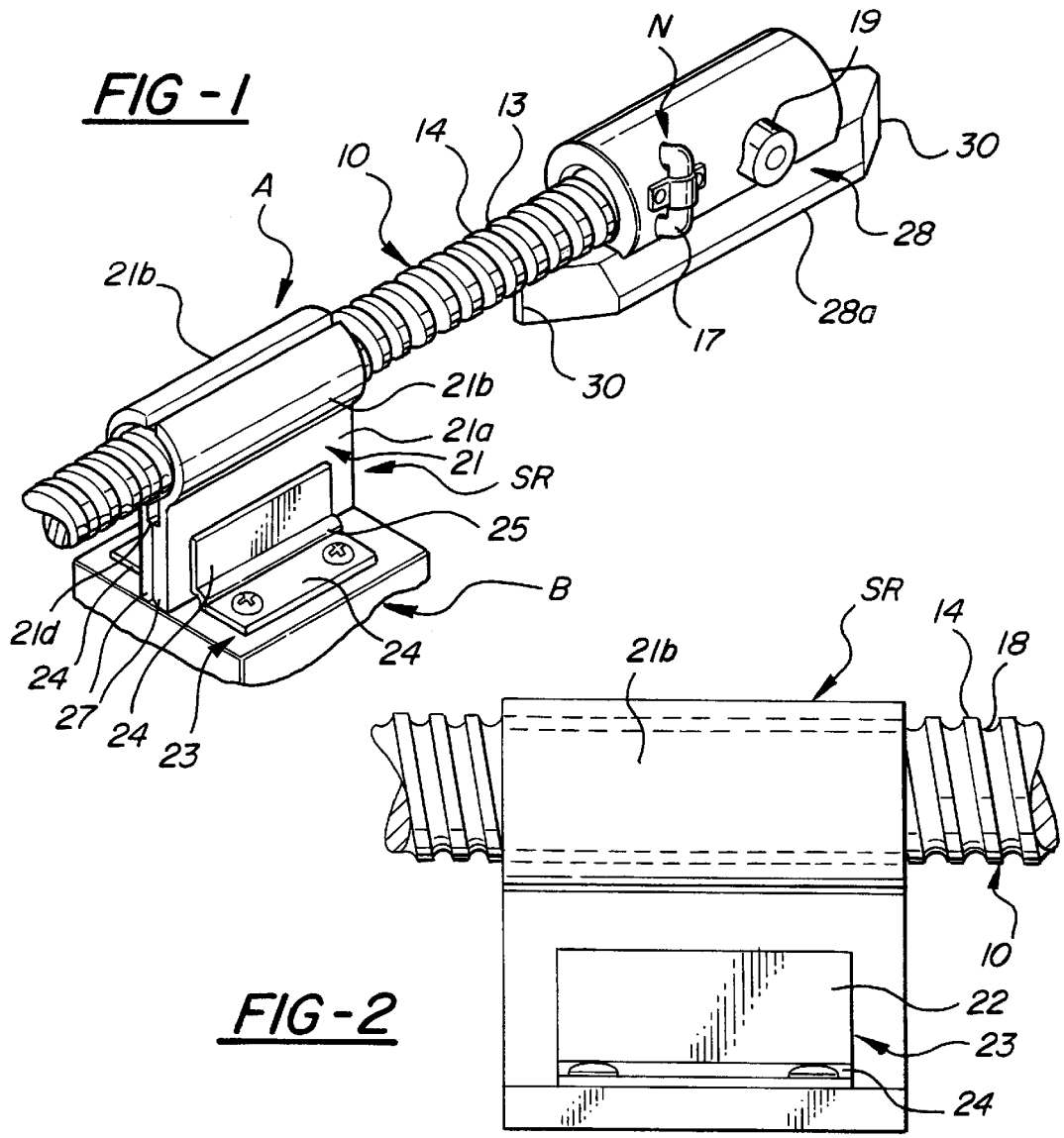
FIG-1
FIG-2
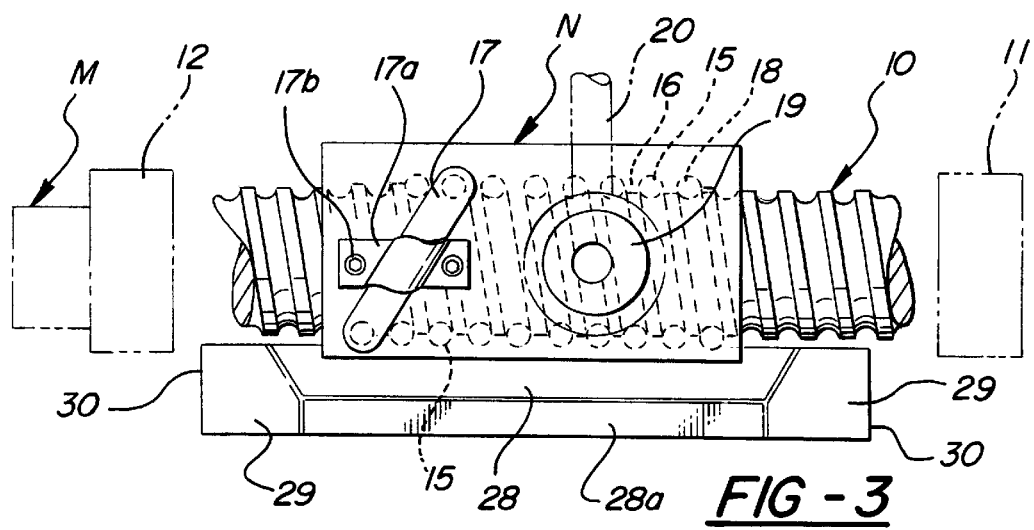
FIG-3

BALL SCREW AND NUT ASSEMBLY INCORPORATING A PARTIBLE MULTIPLE JAW SUPPORT SYSTEM FOR SUPPORTING AN AXIALLY ROTATABLE BALL SCREW

BACKGROUND OF THE INVENTION

The application claims the priority of provisional application 60/080,097, filed Mar. 31, 1998.

The invention is concerned with ball screw and nut assemblies wherein the ball screw is elongate and needs to be supported interjacent its bearing supported ends to avoid the sagging and whipping of the ball screw which will otherwise degrade the performance of the ball screw and nut assembly and cause maintenance problems as well. In the past, to my knowledge, steady rests provided for supporting a ball screw intermediate its bearing-supported ends have been capable only of engaging and radially supporting a limited portion of the circumference of the screw, and have been capable only of reacting against radial loads imposed in limited radial orientations.

SUMMARY OF THE INVENTION

In the system to be described, an elongate, axially immobile ball screw shaft is supported for rotation near its ends, and jaws having opposed, curvilinear faces are pivotally mounted for swinging movement in opposed lateral directions away from a normal position in which they compositely provide a bearing surface for substantially the entire circumference of the ball screw interjacent the ends of the ball screw to a removed position out of the path of the ball nut. An axially extending actuator or spreader surface on each end of the nut engages actuator surface on the jaws to cam or wedge the jaws to swing in opposed directions laterally outwardly away from the ball screw sufficiently to permit the ball screw to pass the jaws, which are biased to return to ball screw supporting position when the ball nut passes.

The methods of construction and operation contemplate providing V-shaped jaw spreading camming surfaces on the ends of the nut to engage follower surfaces on the jaws. The jaws are pivotally supported sufficiently remotely from the jaw bearing surfaces to provide sufficient swinging of the jaws to clear the ball nut passage path.

One of the prime objects of the present invention is to provide an assembly in which the nut may have a continuous diameter permitting the ready passage of load bearing balls in a ball circuit or ball circuits so that the operation of the ball nut and screw assembly is not in any way compromised by the fact that the ball nut must pass beyond the steady rest which, in operative position, virtually encircles the ball screw.

A further object of the invention is to provide a system of the type described which prevents sagging of the ball screw intermediate its ends and thereby prevents consequent whipping of the ball screw when it is rotated at the ever increasing speeds required in present day commercial uses of such elongate ball nut and screw assemblies.

A further object of the invention is to provide an assembly of the type described which is sufficiently stiff and stable to promote maximum operating performance, and a maximum endurance life.

Still a further object of the invention is to provide a relatively simple, readily serviced, axially fixed support system for rotating elongate screws, which minimizes operating system efficiency loss, controls ball screw wear, and can be easily and economically provided.

Still a further object of the invention is to provide a ball nut and screw assembly of the character described wherein the diameter of the ball drive screw can be reduced and vibration of the screw can be prevented such that operation of the assembly will not deleteriously affect the operation of the system which is moved by the ball nut.

Other objects and advantages of the invention will become apparent with reference to the accompanying drawings and the accompanying descriptive matter.

THE DRAWINGS

The presently preferred embodiment of the invention is disclosed in the following description and in the accompanying drawings, wherein:

FIG. 1 is a fragmentary, perspective, elevational view of the ball screw and nut assembly of the present invention;

FIG. 2 is an enlarged, fragmentary side elevational view thereof illustrating the steady rest support system which is integrated with the assembly;

FIG. 3 is a similar view particularly illustrating the ball nut;

DETAILED DESCRIPTION OF THE DRAWINGS

Figure 4:
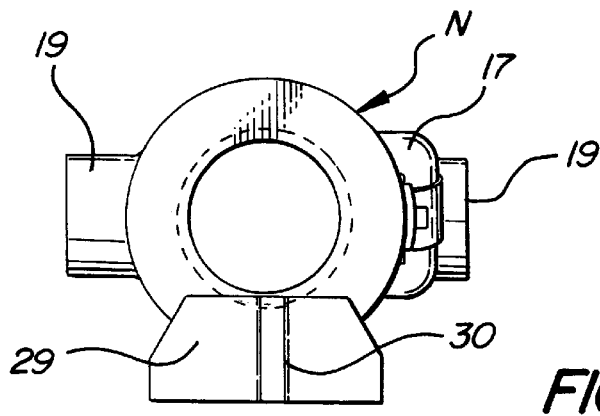
FIG. 4 is an end elevational view of the ball nut only.
Figure 5:
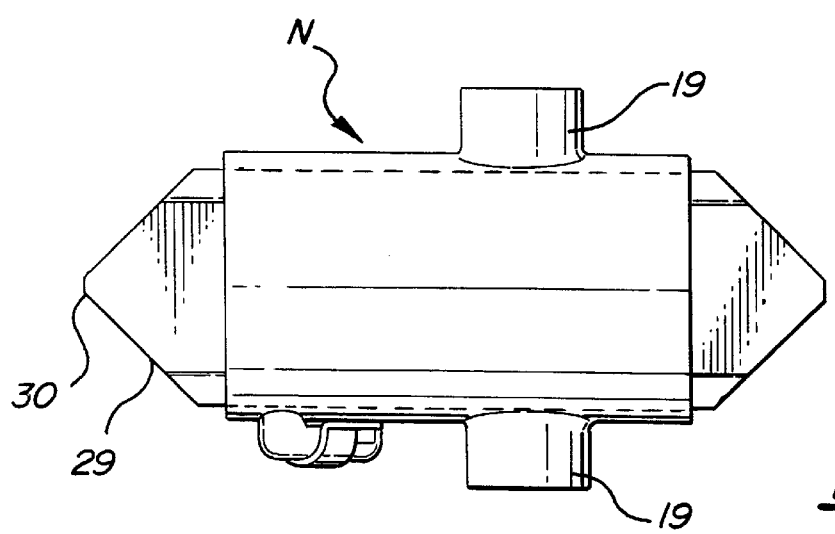
FIG. 5 is a top plan view thereof.

Referring now more particularly to the accompanying drawings and in the first instance to FIGS. 1–3, the ball screw and nut operating assembly, generally designated A, includes a typical, elongate ball screw generally designated 10 and a ball nut, generally designated N, which is of conventional design except for a dependent spreader system which will presently be described. The system A further incorporates a steady rest system generally designated SR which is provided intermediate the ends of the assembly A. Both the schematically illustrated ball screw supporting end bearings 11 and 12 (FIG. 3) may be supported by the base B upon which the steady rest system SR is supported. The schematically illustrated ball screw motor drive unit M can incorporate an electric motor of conventional design, or any other appropriate source of rotary power, and a gear reduction unit normally will also be incorporated with the motor drive unit M.

The ball screw 10, as usual, includes a helical land or land portions 13 separated by a helical groove or groove portions 14. The nut N similarly has an internal complemental helical groove or groove portions 15, separated by a helical land or land portions 16 in the usual manner. A ball return tube 17 of conventional character is carried by the nut N and communicates with a ball return or other system provided by the nut N for recirculating the load bearing actuator balls, generally designated 18. Alternatively, the ball return system carried by the nut N may be of the internal variety. While the ball shaft 10 and ball nut N have only been generally described, it is to be understood that they are of conventional design, and may be, for example, of the design disclosed in the present assignee's U.S. Pat. Nos. 5,485,760, and 5,193,409, which I incorporate herein by reference.

The ball nut N further may have support trunnions 19 extending laterally on which upwardly extending lever arms 20 or the like may be appropriately mounted for connection to remote operating systems (not shown) which are to be actuated as the nut N travels axially. While the trunnions 19 are shown as projecting laterally, and levers 20 are shown as mounted on the trunnions, it is to be understood that these operating members are disclosed only as typical and that the nut may be otherwise suitably connected to the system which it is provided to activate. Similarly, the position of the ball return tube 17, or multiple return tubes for multiple ball circuits, can be on top of the nut N or provided in any other position, along with the strap 17a, having fasteners 17b, which fixes the tube 17 in position.

Figure 6:
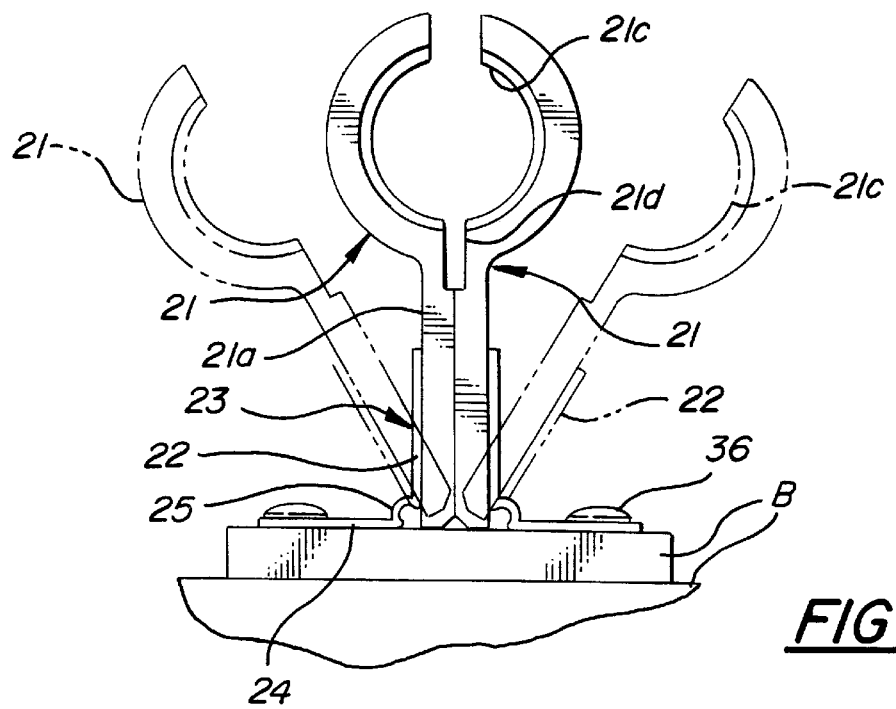
FIG. 6 is a an elevational view of the steady rest only, the chain lines indicating the withdrawn position of the swingable ball screw supporting arms.

The steady rest system SR, as FIGS. 1 and 6 particularly indicate, includes a pair of opposing partible support jaw members, jaws, or arms generally designated 21 which include vertical leg portions 21a and upper semi-circular arcuate portions 21b which are provided with bearing wear surfaces 21c having an internal diameter such as to engage and support the land portions 13 of the ball screw S when the arms 21 are in the normal operating position shown in FIGS. 1 and 6. The arcuate or curvilinear surfaces 21b, as FIG. 6 discloses, normally mount replaceable bearing surfaces 21c of an appropriate character which function as wear strips. Typically, such strips may be formed of a long wearing material and the system controls wear and permits the easy servicing of the unit to replace the wear strips when this becomes necessary.

Each of the base portions 21a of the screw support arms 21 is fixed to the one leaf 22 of a spring steel leaf spring hinge device, generally designated 23, which includes also a base leaf 24 fixed by screws or other fasteners to the base B as at 26. The leaf 22 of each hinge device 23 may be forced outwardly about the resilient hinge connecting spring portion 25 which integrally joins leaf portions 22 and 24, and will be restored by the resiliently deformed portions 25 when the force is removed.

Alternatively, the base leaf 24 may include a bearing portion for supporting a hinge pin upon which bearing portions of the hinge leaf 22 mount. Torsion springs having ends bearing on the leafs 22 and 24 in the usual manner may then be provided to bias each leaf 22 to the solid line position shown in FIGS. 1 and 6. Other spring mechanisms for biasing the jaws 21 are also possible.

It will be observed that the jaws or arms 21 have convergent end follower or actuator faces 27 when in the abutting position shown in FIGS. 1 and 6, and are recessed as at 21d. Provided on the nut N to interact with the surfaces 27 is a spreader system comprising a depending cam actuator block 28, which at its ends has convergent wedge spreader faces 29 bounding surfaces 28a. The wedge faces 29 terminate in end walls 30.

The Operation

When the nut N moves axially along the rapidly rotating, but axially immobile ball screw 10, it is one of the surfaces 30 which first engages the inwardly sloped surfaces 27 of the steady rest jaws or arms 21 and commences to initially spread them. The wedge surfaces 29 then further gradually spread them to the position shown in chain lines in FIG. 6 such that ball nut N can pass between the spread support portions 21b of the steady rest legs 21a and then axially beyond the axially fixed steady rest system SR. The hinge springs 23, which are biased to normally maintain the closed position of jaws 21, then operate to restore the jaws 21 to the ball shaft supporting position, when permitted to do so. The surfaces 28a maintain the spread position and then the trailing surfaces 29 smoothly guide the jaws 21 to restored position.

When the nut N is to move in the opposite direction, these surfaces 30 and 29 operate in the same manner to again spread the legs 21a sufficiently to prevent the nut N to pass without any contact between straps 17 and trunnions 19, and, of course, hinging springs 23 will again restore the steady rest jaws 21 to normal position. Once the nut N has substantially passed, trailing wedge or spreader surfaces 29 again guide the arms 21 back to restored position.

Method of Construction

The nut N and ball screw 10 are conventionally provided and it is only necessary to fix the actuator system 28 to the nut N in any conventional manner, as by welding or with suitable fasteners, for example. It is only necessary then to mount the leafs 24 of hinges 23 in a suitable position on a base intermediate the ends of the bearings 11 and 12 which are provided in the first place to support the ends of the ball screw 10 in rotary, axially immobile position.

The disclosed embodiment is representative of a presently preferred form of the invention, but is intended to be illustrative rather than definitive thereof. The invention is defined in the claims.

I claim:

1. In a ball screw and nut actuator assembly incorporating an elongate bearing supported rotatable ball screw, the combination, with said screw of:
   a. a partible, opposed jaw steady rest support comprising jaw members with opposed curvilinear faces and legs pivotably moveable for lateral swinging movement in opposed directions away from a first position in which said faces substantially compositely embrace the ball screw and engage the circumferential land surface of the ball screw to a removed second spread apart position; and
   b. a ball nut on said ball screw providing with said ball screw a raceway for recirculating load bearing balls, for moving said nut axially along said ball screw with rotation of said ball screw, said nut having a spreader on each of its ends interactable upon engagement with said jaw members to automatically move said jaw members from said first position to said second spread position to permit said nut to pass axially by said steady rest support.

2. The combination of claim 1 wherein said spreader on each end of the ball nut comprises a camming wedge interactable with both of said legs.

3. The combination of claim 2 wherein laterally inwardly inclined follower surfaces on said legs are provided in axial alignment with each spreader wedge.

4. The combination of claim 1 wherein actuator connectors are provided on said nut.

5. The combination of claim 1 wherein curvilinear ball screw land engaging, substantially semi-circular, wear segments secure to said legs and form said faces.

6. The combination of claim 1 wherein said legs are elongate members pivotally connected near ends remote from said faces for sufficient spreading swinging movement to permit axial passage of said nut.

7. The combination of claim 6 wherein springs bias said legs to said first position.

8. The combination of claim 7 including a frame, bearings thereon, and a mechanism preventing axial motion of said ball screw, and wherein said steady rest support includes a frame supported base, and said springs are deformable hinge devices which hingedly mount said legs on said base.

9. A method of constructing a ball screw and nut actuator assembly comprising:
   a. providing an elongate ball screw with a helical groove defining a helical land between its turns and mounting said ball screw for rotation while preventing its axial motion;

b. mounting a ball nut with a helical groove formed to provide a ball raceway with said screw groove and loading load bearing balls to said raceway;

c. providing partible, normally closed jaw members with opposed curvilinear surfaces for virtually encircling and supporting the screw land interjacent the ends of the ball screw, the jaw members having projecting support legs;

d. swingably mounting said legs for movement in opposed directions from a first position in which said curvilinear surfaces embrace said land to a removed second spread apart position; and e. providing spreaders on each end of said ball nut in position to interact with and spread said jaw members upon axial engagement therewith to permit axial passage of said nut past said jaw members.

10. The method of claim 9 including the step of providing springs which normally said jaw members to said first position.

11. The method of claim 9 wherein the spreaders are provided as V-shaped camming wedges.

12. The method of claim 11 including the step of providing axially laterally inclined follower surfaces on said jaws to interact with said wedges.

13. In a steady rest system for a ball screw and nut actuator incorporating a bearing supported, rotatable, but axially restrained, ball screw and an axially moveable, non-rotatable nut, the nut and screw having a helical land formed by a helical groove providing a raceway for load bearing balls which drive the nut upon rotation of the screw, and the nut having spreader surfaces at its ends:

a. a partible, normally closed steady rest support having opposed jaw members with curvilinear faces for supporting the screw land interjacent the ends of the screw, the jaw members having projecting support legs;

b. swingable mounts for the projecting ends of said legs mounting them for swinging movement from a first position in which said curvilinear surfaces embrace said land to a second removed position in which said jaw members are spread apart to permit passage of said nut past said steady rest support; and c. actuator surfaces on said jaws for cooperation with said spreader surfaces on the nut to spread said jaw members.

14. The system of claim 13 wherein said mounts bias said legs to said first position.

15. A method of operating a ball screw and nut actuator assembly having an elongate ball screw with a helical groove defining a helical land between its turns and mechanism mounting said ball screw for rotation while restraining its axial motion; a ball nut with a helical groove formed to provide a ball raceway with said screw groove, and load bearing balls in said raceway; partible, normally closed, axially stationary, jaw members with opposed curvilinear surfaces for virtually encircling and supporting the screw land interjacent the ends of the ball screw, the jaw members having projecting support legs; mounts swingably mounting said legs for movement in opposed directions from a first position in which said curvilinear surfaces embrace said land to a removed second spread apart position; and generally wedge-shaped spreaders on each end of said ball nut in position to interact with and spread said jaw members upon axial engagement therewith to permit axial passage of said nut past said jaw members; the steps of:

a. moving said ball nut wedge-shaped spreaders axially along said ball screw into engagement with each of said jaw members; and b. continuing to move said ball nut and spreaders axially along said ball screw to a position axially beyond said jaw members while gradually spreading said jaw members from first to second positions.

16. The method of claim 15 comprising returning said jaw members gradually from said second to said first positions and encircling engagement with said ball screw land as said ball nut and spreaders move axially beyond said jaw members.

* * * * *